Figure 1:
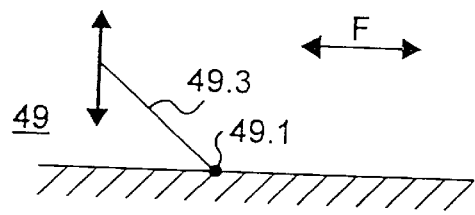

United States Patent [19]
Fuchs

[11] Patent Number: 6,085,697
[45] Date of Patent: Jul. 11, 2000

[54] DEVICE FOR CONVEYING ANIMALS

[75] Inventor: Peter Fuchs, Adlikon, Switzerland

[73] Assignee: Peter Fuchs Technology Group, Adlikon, Switzerland

[21] Appl. No.: 09/051,669

[22] PCT Filed: Sep. 11, 1996

[86] PCT No.: PCT/CH96/00313

§ 371 Date: Aug. 21, 1998

§ 102(e) Date: Aug. 21, 1998

[87] PCT Pub. No.: WO97/13412

PCT Pub. Date: Apr. 17, 1996

[30] Foreign Application Priority Data

Oct. 11, 1995 [CH] Switzerland ............................. 2871/95

[51] Int. Cl.[7] ................................................. A01K 29/00
[52] U.S. Cl. ........................................ 119/845; 119/843
[58] Field of Search ................................... 119/843, 844, 119/845, 846, 847

[56] References Cited

U.S. PATENT DOCUMENTS

| | | | |
|---|---|---|---|
| 3,871,335 | 3/1975 | Johnston et al. | 119/846 |
| 4,191,131 | 3/1980 | Farlow | 119/843 |
| 4,736,710 | 4/1988 | Nicolai | 119/844 |
| 5,070,818 | 12/1991 | Gearn et al. | 119/845 |
| 5,743,217 | 4/1998 | Jerome | 119/846 |
| 5,852,989 | 12/1998 | Fuchs | 119/843 |
| 5,863,174 | 1/1999 | Mola | 119/846 |

FOREIGN PATENT DOCUMENTS 37 17 132 C1  5/1998  Germany .

*Primary Examiner*—Peter M. Poon
*Assistant Examiner*—Elizabeth Shaw
*Attorney, Agent, or Firm*—Lacasse & Associates; Randy W. Lacasse

[57] ABSTRACT

The invention relates to a method and a device for animal-appropriate conveying, in which animals are conveyed in conveying channels, the animals being advantageously conveyed separated from one another in columns and the animals are guided at a drive mechanism (49) onto a platform (49.3), which is swivelled and the animals are driven into a conveying space (50).

28 Claims, 5 Drawing Sheets

DEVICE FOR CONVEYING ANIMALS

The invention relates to a method and a device for conveying loads and specifically relates to a conveying method by means of an animal-appropriate conveying device, such as are disclosed in the claims.

Mechanical conveyors with continuous load surfaces are used for numerous different purposes and inter alia serves for column conveying of loads, such as animals and humans. Such conveying devices can be in the form of slides, roller conveyors, as well as ski lifts.

Specifically for the conveying of animals conveying methods have been developed, in which pigs, calves and sheep stand with their feet on a roller conveyor and are conveyed in a conveying channel, e.g. to a slaughter bench. Other conveying methods make use of gondolas, in which the animals stand in gondolas and are immersed in cleaning or gas baths.

A disadvantage of conveying animals by means of roller conveyors and/or gondolas is in particular the difficulty of the animals on entering or transferring to the roller conveyors and/or gondolas. Animals oppose such an entry or transfer. In order to obviate this disadvantage, e.g. using restrictive supply aids such as electric shocks, the animals are driven. This conveying device is not suitable for an unaccompanied, automatic conveying of animals and does not allow a animal-appropriate entry and transfer. The need for using restrictive supply aids gives rise to stress anti fear conditions in the animals when said conveying device is used.

The object of the invention is to provide an animal-appropriate conveying method and in particular a conveying device for conveying animals in a stress and fear-free manner. The invention also aims at a substantially automated operation, i.e. so as to permit operation without manual animal supply.

These objects are achieved by the claims.

The invention aims at avoiding the causes of stress and fear situations in the animals being conveyed. Technical means adapt the animal conveying to natural behavioural patterns of the animals. In the same way as e.g. the width of the load conveyor belts are matched to the width of the loads to be conveyed, the inventive conveying and transfer of the animals takes place in conveying channels and drive means matched to the animal size and the behavioural pattern thereof.

The transportation, as well as the entry to and transfer to roller conveyors and/or gondolas take place without compulsion, without any action of fear-inducing or stress-generating supply aids. According to the invention the animals are conveyed by means of drive mechanisms into conveying zones such as roller conveyors and/or gondolas. The animals are guided on a platform and by swivelling in the platform the ground is removed from under their feet, a return or turning round is made impossible for them and they are dosed in the conveying spaces or areas.

The conveying device according to the invention can be used in numerous different ways. The animals dosed in this way into the conveying spaces can be conveyed on weighing scales or for cleaning purposes, can be conveyed for veterinary examination purposes or for injections, whilst also permitting conveying to shearing points for sheep and to slaughter benches for animals being slaughtered.

The method and device according to the invention are described in greater detail hereinafter relative to the attached drawings, wherein show:

FIG. 1 Diagrammatically the principle of the invention.

Figure 2:
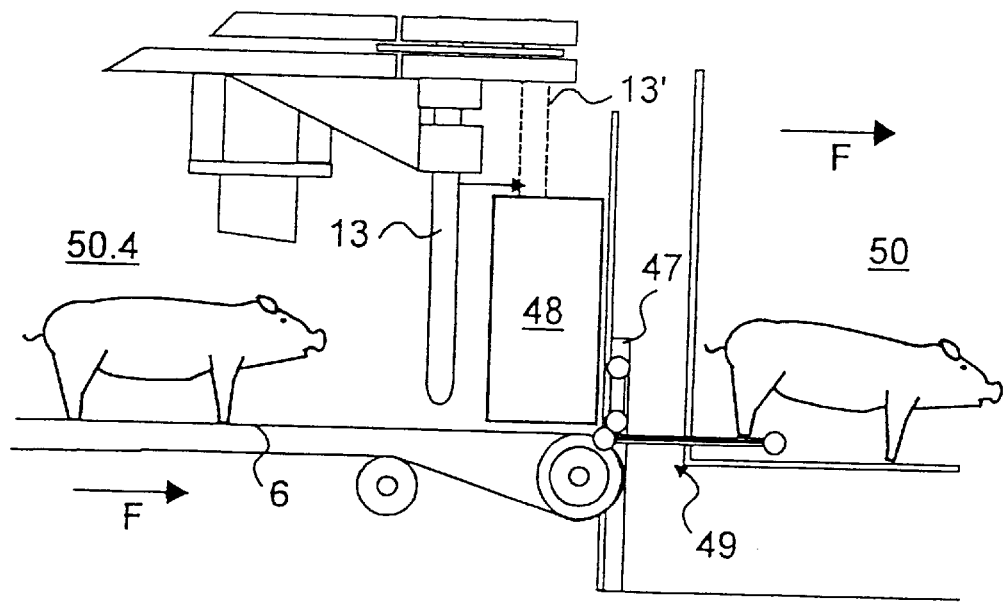
Figure 3:
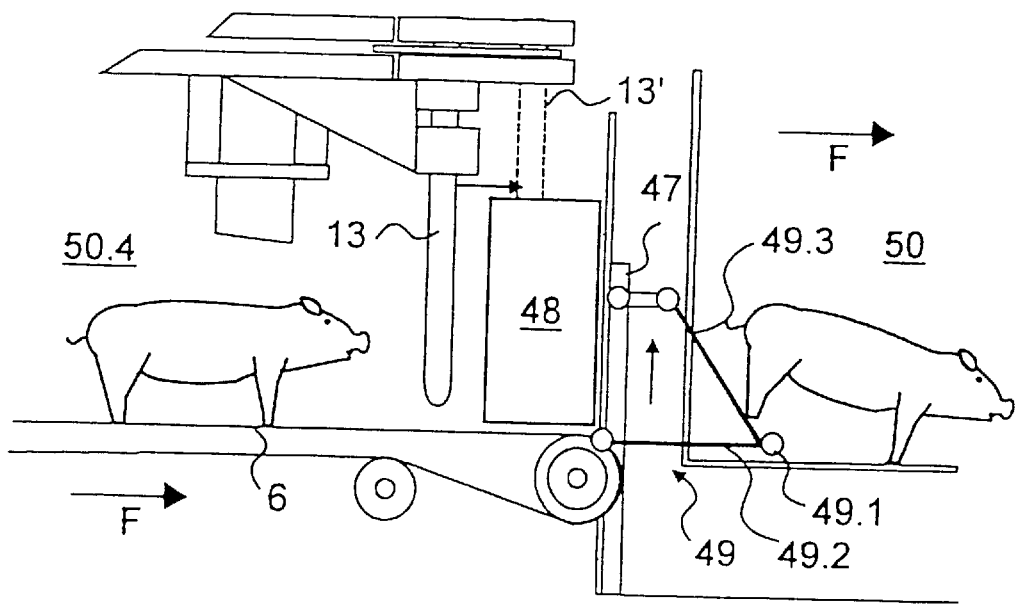
Figure 4:
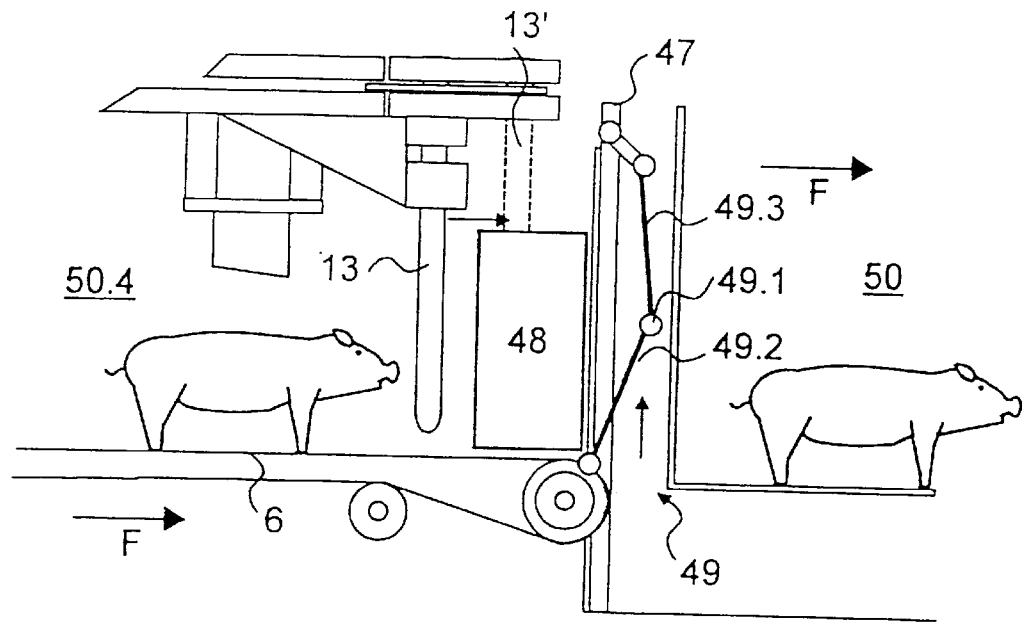

FIGS. 2 to 4 A side view of part of a preferred embodiment of an inventive conveying device with dosing belt and drive mechanism, as well as the kinematics of swinging in the platform.

Figure 5:
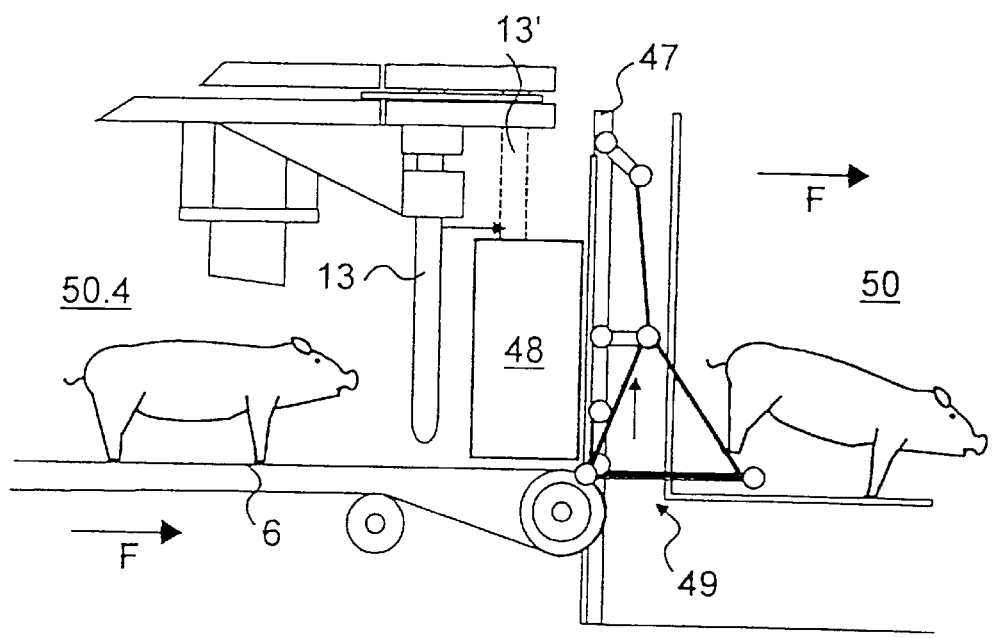

FIG. 5 In side view the embodiment of the conveying mechanism according to FIGS. 2 to 4 without transfer kinematics.

Figure 6:
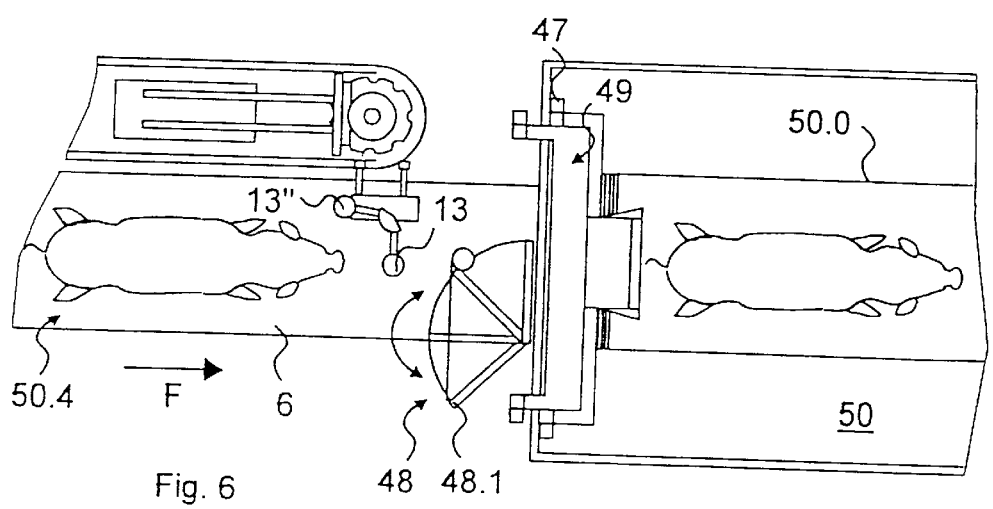

FIG. 6 In plan view the embodiment of the conveying device according to FIGS. 2 to 5 without transfer kinematics.

FIGS. 7 to 10 In plan view part of a preferred embodiment of an inventive conveying device with dosing belt and drive mechanism and the kinematics of swivelling in a hinged or swivel door.

Figure 11:
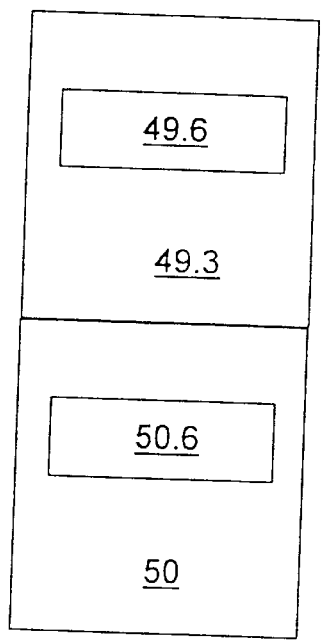

FIG. 11 In plan view an embodiment of the conveying device with presence detectors for detecting animals standing on the platform.

FIG. 1 is a diagrammatic drawing of the principle of the invention. The animal-appropriate conveying device makes use of a drive mechanism 49 with a spatially orientable platform 49.3. As a function of the spatial orientation with respect to the conveying plane of the animals to be conveyed said platform 49.3 provides the animals with a secure hold or support, or offers them little or no hold or support and also constitutes an obstacle. Thus, the animals pass onto a largely planar platform 49.3 with an inclination angle of e.g. 0° in the conveying direction and find a secure hold thereon and can easily stand. On a sloping platform 49.3 of e.g. 45° to the conveying plane according to FIG. 1, the animals have little or no hold, so that animals are unwilling to walk onto such a sloping platform 49.3 and if they are standing thereon, attempt to climb off it. Finally, a wall-like platform 49.3 with an inclination angle of e.g. 90° to the conveying plane provides the animals with no hold and constitutes an obstacle. In the case of a planar platform 49.3, the drive mechanism 49 enables the animals to climb on and when the platform 49.3 slopes drives the animals standing thereon.

The provision of a variation in the spatial orientation of the platform 49.3 e.g. takes place by means of one or more pivot or rotation points, e.g. implemented in the form of one or more hinges 49.1, which constitute a link between the platform 49.3 and the substrate and which permit a flap-like or hinge-like operation of the drive mechanism 49. Depending on the extent to which the free end of the platform 49.3, opposite to a hinge 49.1 is deflected about the latter, the platform 49.3 projects to a greater or lesser extent into the conveying plane. This deflection is indicated by a vertical double arrow in FIG. 1, whilst the conveying direction F in the conveying plane is indicated by a horizontal double arrow. With the knowledge of the present invention numerous possibilities are open to the expert for implementing such deflecting in and out mechanisms. For example, through the use of extension plates and further hinges, it is possible to vary the lifting movement of the platform 49.3. Preferred implementations are discussed relative to the following drawings.

According to FIGS. 2 to 5 there is a dosed columnar conveying of animals on a dosing belt 6. Conveying advantageously takes place in a mirrored or metallizing conveying channel 50.4 having the shoulder height of the animals, which prevents an independent turning round of the animals, such as is illustrated with respect to pigs, in the conveying channel 50.4. The animal conveying arrows close to the dosing belt 6 indicate the conveying direction F. As a result of the mirror illusion the animals are made quieter and relaxed. Swing-in barriers 13, 13', 13" prevent a forward movement and in particular a backward movement of the animals on the dosing belt 6 in conveying channel 50.4. In said dosing spaces the animals are isolated from one another and their movement space is restricted. For further details concerning a dosed conveying in conveying channels 50.4 reference is made to Swiss application 3040/94-7 of the present applicant. Naturally the drive mechanism according to the invention can be used without such a dosing belt 6, e.g. for animals located in a running channel. An entry and transfer of the animals conveyed in dosed manner in a conveying space 50 takes place at a drive mechanism 49. This conveying space 50 is e.g. constructed as a gondola 50.0. For this purpose the barrier 13, 13', 13" is swung out in front of each conveyed animal, similar to the swinging out in the case of ski lifts using a swing-out device, as can be seen in the plan view of FIG. 6, so that the animals are given access to an e.g. advanced gondola 50.0 located at the end of the dosing belt 6. The swing-out device is e.g. operated by an electric motor or by pressure action and is automatic. Naturally the inventive drive mechanism is also usable without such barriers 13, 13', 13", e.g. for animals in a running channel or conveyed on a running belt.

Figure 7:
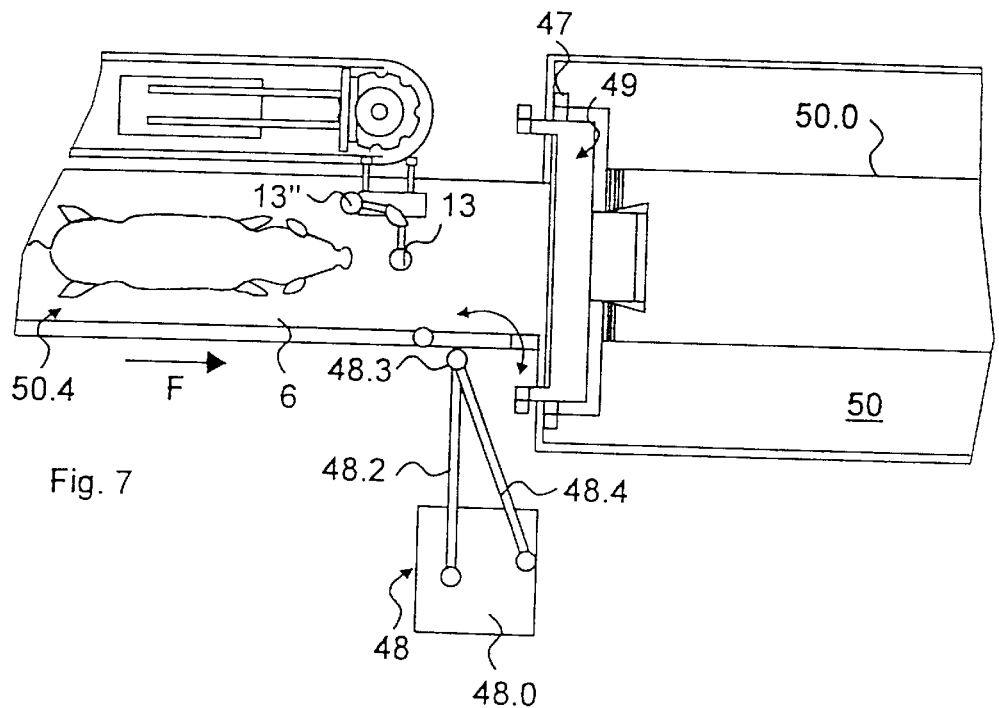

In the embodiment according to FIG. 2 the animals climb via a platform 49.3 using their front feet into the gondola 50.0, so that they stand with their back feet on the platform 49.3. They are prevented from turning back or round by means of a fold-in or swing-in return barrier 48. According to FIG. 6 the return barrier 48 is constructed as a turning door 48.1, which can e.g. be flapped by 90° into the conveying channel 50.4 (cf. curved double arrow). According to FIGS. 7 to 10 the return barrier 48 is constructed as a swing door 48.2 which can be moved and swung into the conveying channel 50.4, which functions in accordance with a similar mechanism to the platform 49.3. Return barriers 48 using either a turning door 48.1 or a swivel door 48.2, can be used in conveying channels 50.4 with and without dosing belts or barriers (cf. e.g. FIG. 7 compared with FIGS. 8 to 10 with and without dosing belts 6 or barriers 13). The advantages of a swivel door 48, which can be moved and swung in, compared with a rotary door 48.1 is that it takes up less space and consequently restricts only slightly the space taken up by the following animal in the column on moving and swinging in and consequently does not force back and impede said animal.

Figure 8:
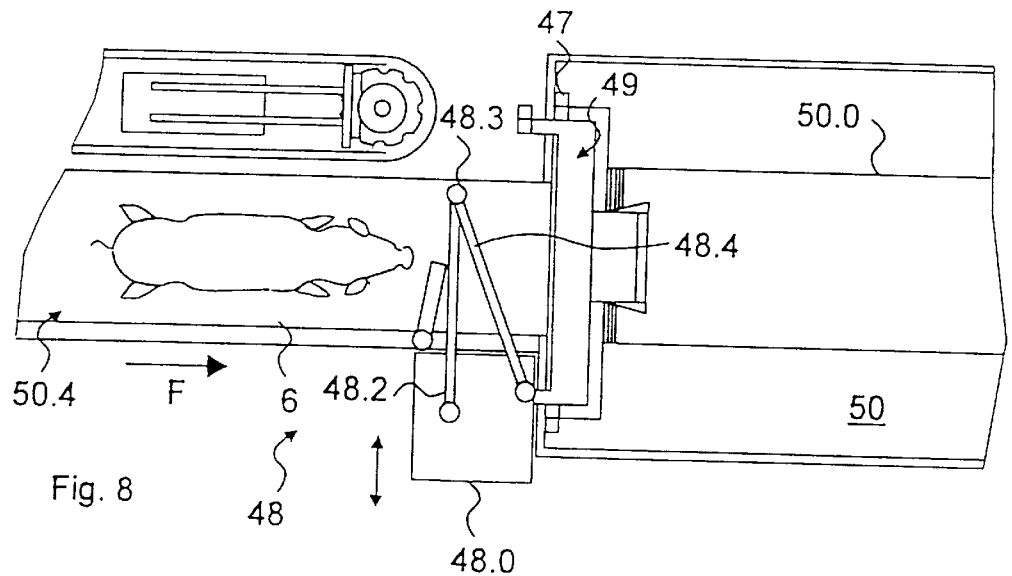
Figure 9:
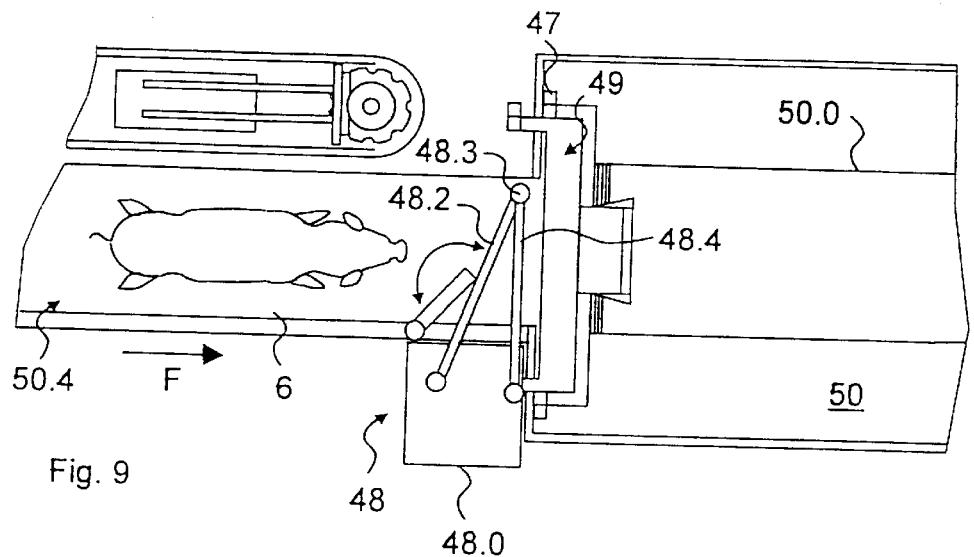
Figure 10:
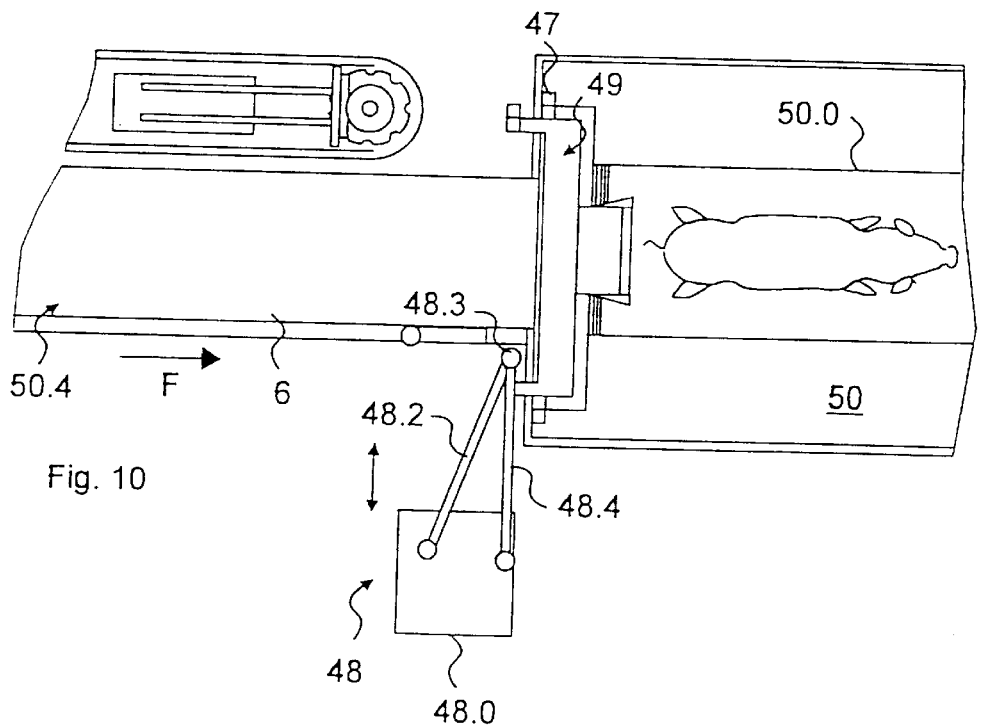

The swing-in swivel door 48.2 advantageously has a sliding plate 48.0, which can be moved in and out, in sloped manner to the conveying direction F, e.g. at a right angle, as indicated by a double arrow in FIGS. 8 and 10. The swivel door 48.2 is mounted on said sliding plate 48.0. In addition to the moving in and out of the sliding plate 48.0, the swivel door 48.2 is movable in articulated manner transversely to the conveying direction F, e.g. about a swivel hinge 48.3. This swivelling movement is indicated by the curved double arrow in FIG. 9. Said special kinematics of a moving in and swinging in movement according to FIGS. 7 to 10 permits a matching of the return barrier 48 to animal-like behavioural patterns. An appearing wall stops an animal, whereas an opening space permits the animal to move forwards.

According to FIG. 7 the swivel door 48.2 on the sliding plate 48.0 is introduced into the conveying channel 50.4 and this can take place simultaneously with the folding out of the barriers 13 according to FIG. 6, so that, considered in the conveying direction, the left folding out barrier 13 according to FIG. 6 is replaced by a right and sloping introduced swivel door 48.2 according to FIG. 8. Therefore the animal is continuously prevented from moving forwards by a barrier, firstly e.g. the barrier 13, then the swivel door 48.2 according to FIG. 8 or the turning door 48.1 according to FIG. 6. The difference between said two embodiments is that the inwardly turning door 48.1, due to its greater space requirement, forces back the animal, which is not the case with the swivel door 48.2.

According to FIG. 9 the swivel door 48.2 swivels in transversely to the conveying direction F and opens for the animal a free space in said direction F. Accompanied by the optional use of a dosing belt 6, the swivel door 48.2 during the said swivelling movement by moving its two ends 48.3, 48.4 transversely to the conveying direction F runs together with the dosing belt 6. This is unlike in the embodiment with the turning door 48.1 according to FIG. 6, where the folding out door 48.1 is turned counter to the conveying direction F and the animal is forced back. According to FIG. 10 the swivelled in swivel door 48.2 is moved back on the sliding plate 48.0, so that the animal is provided with access to the platform 49.3.

The folding in and out of the rotary door 48.1 or the swivelling in and out of the sliding plate 48.0 and/or swivel door 48.2 e.g. take place by electric motors, or by pressure action and in automatic manner. Naturally the drive mechanism according to the invention can be used without such return barriers 48, e.g. for animals conveyed running in a conveying channel with a running channel or on a running belt in a conveying channel in standing, non-dosed manner.

The swivelling in of the platform 49.3 e.g. leads to the ground being removed from the back feet of the animals, so that the latter are conveyed into the gondola 50.0. In the embodiment according to FIGS. 3 and 4 the swivelling in of the platform 49.3 takes place in a plane in sloping or perpendicular manner to the conveying direction F, indicated by the arrow close to the platform 49.3. The drive mechanism 49 has a hinge 49.1, connecting in articulated manner a first end of the platform 49.3 and a first end of an extension plate 49.2. The other end of the extension plate 49.2 is connected in articulating manner to the conveying channel bottom, while the other end of the platform 49.3 is connected in an articulated manner to a slide 47. The swivelling in of the platform 49.3 takes place by the movement of the slide in the sliding direction conversely a swivelling out of the platform 49.3 takes place by the movement of the slide 47 counter to the sliding direction. The slide 47 is e.g. driven by a commercial electric motor, by pressure action and in automatic manner. With the knowledge of the invention numerous possibilities are available to the expert for implementing such platforms for removing the ground from the feet of the conveyed animals. For example, the platform 49.3 can be made larger, so that the animals stand with their front and back feet on the platform 49.3. For example, the platform 49.3 can be used with and without further extension plates 49.2. Such further extension plates can in turn serve as platforms for the climbing up of animals to be conveyed. The advantages of using further extension plates 49.2, which are e.g. interconnected by means of further hinges, permits a variation in the lifting movement of the platform 49.3. Thus, drive mechanism swivellable in fan-like manner can be obtained which, compared with their fanned out, swivelled out length, require a small depth for swivelling in, and which in the fanned in, swivelled in state take up little space. They are suitable for subsequent installation in means, where little space is available.

The kinematics of the advance of a gondola 50.0 to the transfer point, the folding out of the barriers 13, 13', 13", the folding in of the return barrier 48 and the swivelling in of the platform 49.3 shown in FIGS. 2 to 4 are matched to one another and can be initiated by means of presence detectors of the drive mechanism 49. Such presence detectors are e.g. pressure sensors or video detectors, which detect the presence of conveyed animals in the vicinity of the drive mechanism 49 and by means of a presence signal automatically start up the drive, which is correspondingly automatically controllable. With the knowledge of the present invention the expert has numerous possibilities for implementing such presence detectors. FIG. 11 shows in plan view an embodiment of the conveying device with exemplified embodiments of such presence detectors for detecting animals standing on the platform. The presence detectors are e.g. constructed as one or more pressure sensors 49.6, 50.6 on the platform 49.3 and/or conveying space 50. An animal to be conveyed by means of the drive mechanism 49 releases said pressure sensors 49.6, 50.6 e.g. on climbing up onto the platform as a result of its own weight and said detectors then emit presence signals, which start the automatic operation of the drive mechanism.

What is claimed is:

1. An apparatus for conveying animals comprising:
    a platform for supporting an animal, and
    means for swiveling the platform in a conveying direction for advancing the animal standing thereon,
    wherein the means for swiveling the platform is adapted to incline the platform to an angled position on which the animal can no longer stand.

2. An apparatus as defined in claim 1, wherein the platform is movable from a substantially level position to a position at least 45 degrees inclined to the level.

3. An apparatus as defined in claim 2, further including a conveying channel for advancing an animal onto the platform.

4. An apparatus as defined in claim 3, further including a conveying space for receiving an animal from the platform as the animal is advanced.

5. An apparatus as defined in claim 4, wherein the conveying space comprises a gondola.

6. An apparatus as defined in claim 11, wherein the means for swiveling is operable to change the platform from a first position in which an animal is capable of remaining at rest to a second inclined position in which the animal is unsettled such that the animal advances.

7. An apparatus as defined in claim 6 wherein the platform in the second inclined position is substantially over a region where the platform lies in the first position.

8. An apparatus for conveying animals comprising:
    a platform for supporting an animal movable from a substantially level position to a position inclined to the level;
    means for swiveling the platform in a conveying direction for advancing the animal standing thereon adapted to incline the platform to an angled position on which the animal can no longer stand;
    a conveying space for receiving an animal from the platform as the animal is advanced; and
    a conveying channel for advancing an animal onto the platform the conveying channel comprising a columnar conveying means including:
        drive means for driving a dosing belt means for supporting at least one animal;
        movable return barrier means for separating the conveying space from the conveying channel,
        whereby movement of said return barrier means provides access for one animal to the platform for advancing the animal into the conveying space while preventing advancement of a following animal.

9. An apparatus as defined in claim 8, further including a plurality of movable barrier means for separating a plurality of animals on the conveying channel.

10. An apparatus as defined in claim 8, further including a presence detector for automatically initiating actuation of the means for swiveling the platform.

11. An apparatus as defined in claim 10, wherein the presence detector comprises pressure sensor means on the platform.

12. An apparatus as defined in claim 10, wherein the presence detector includes means for determining the presence of an animal's hind feet.

13. An apparatus for conveying animals comprising:
    a platform for supporting an animal movable from a substantially level position to a position inclined to the level;
    means for swiveling the platforms in a conveying direction for advancing the animal standing thereon adapted to incline the platform to an angled position on which the animal can no longer stand;
    a conveying space for receiving an animal from the platform as the animal is advanced;
    a conveying channel for advancing an animal onto the platform; and
    a return barrier means for preventing the animal from moving backward or turning around.

14. An apparatus as defined in claim 13, wherein the return barrier means comprises a movable door.

15. An apparatus as defined in claim 14 further including folding actuation means for moving the movable door.

16. An apparatus as defined in claim 14 further including swiveling actuation means for moving the movable door.

17. An apparatus as defined in claim 16, wherein the movable door is further movable on a sliding plate inclined to the conveying direction.

18. An apparatus as defined in claim 14, wherein the movable door is movable in concert with movement of a dosing belt for advancing one animal at a time into the conveying space.

19. An apparatus for conveying animals comprising:
    a platform for supporting an animal movable from a substantially level position to a position inclined to the level;
    means for swiveling the platform in a conveying direction for advancing the animal standing thereon adapted to incline the platform to an angled position on which the animal can no longer stand,
    wherein the platform is adapted to swivel between a substantially level position and a substantially vertical position adapted to form a wall to prevent an animal from moving backwards from the conveying space.

20. An apparatus for conveying animals comprising:
    a platform for supporting an animal movable from a substantially level position to a position inclined to the level;
    means for swiveling the platform in a conveying direction for advancing the animal standing thereon adapted to incline the platform to an angled position on which the animal can no longer stand,
    wherein the means for swiveling comprises means for inclining the platform to position a rear end of the platform above a front end of the platform in the direction of travel.

21. An apparatus as defined in claim 20, wherein the means for swiveling comprises a hinge securing an end of the platform in an articulated manner and a slide secured to an opposite end of the platform in an articulated manner for swiveling the platform about the hinge.

22. An apparatus as defined in claim 21, wherein the slide is driven by means selected from the group comprising an electric motor, or a pressure means.

23. A method for conveying an animal within an animal conveying apparatus comprising:

supporting at least a portion of the animal on a supporting platform;

swiveling the platform causing the animal to travel forward in a conveying direction;

advancing the animal in a conveying channel to a supporting platform, wherein the animal is advanced in the conveying channel automatically by a driven belt; and further including the step of continuing to swivel the platform to a substantially vertical position once the animal has traveled forward, to form a wall preventing the animal from moving backwards or turning around.

24. A method for conveying an animal within an animal conveying apparatus comprising:

supporting at least a portion of the animal on a supporting platform; and swiveling the platform causing the animal to travel forward in a conveying direction, wherein the step of supporting at least a portion of the animal on a supporting platform is performed such that the animal is capable of remaining at rest, and wherein the step of swiveling the platform causing the animal to travel forward in a conveying direction results in the platform being inclined to an angled position on which the animal can no longer stand.

25. A method as defined in claim 24, further including the preceding step of: advancing the animal in a conveying channel to a supporting platform.

26. A method as defined in claim 25, wherein the animal is advanced in the conveying channel automatically by a driven belt.

27. An apparatus for conveying animals comprising:

a platform for supporting an animal in a first position on which the animal can stand;

means for swiveling adapted to incline the platform to an angled position on which the animal can no longer stand for advancing the animal standing thereon;

a conveying space for receiving an animal from the platform as the animal is advanced; and, a conveying channel for advancing an animal onto the platform.

28. An apparatus for conveying animals as defined in 27 wherein the conveying channel comprises a columnar conveying means including:

drive means for driving a dosing belt means for supporting at least one animal;

movable return barrier means for separating the conveying space from the conveying channel, whereby movement of said return barrier means provides access for one animal to the platform for advancing the animal into the conveying space while preventing advancement of a following animal.

* * * * *